Sept. 27, 1949.  E. W. SONNER, JR  2,482,881
GUARD FOR FISHING HOOKS
Filed Nov. 18, 1948
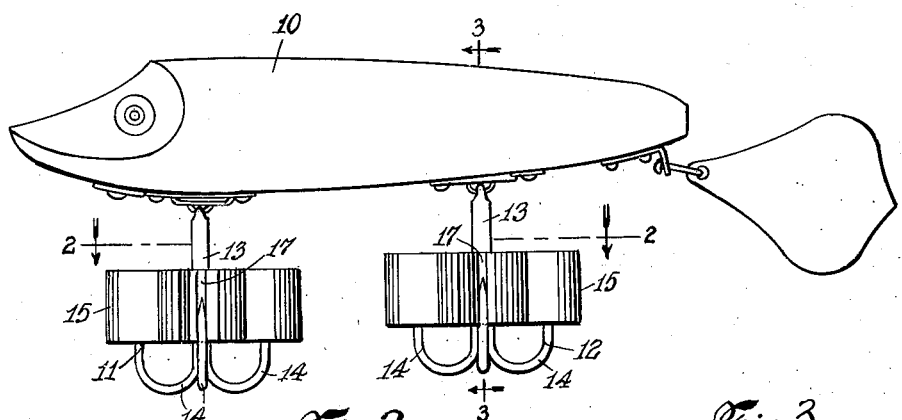
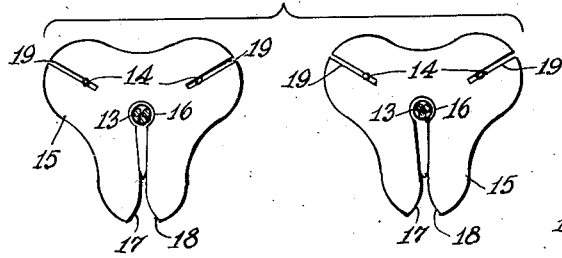 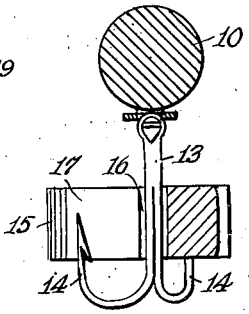
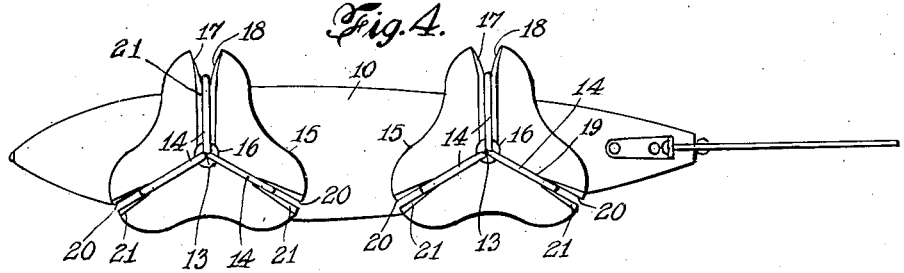
INVENTOR.
EDWIN W. SONNER, JR.
BY
ATTORNEY.

Patented Sept. 27, 1949

2,482,881

UNITED STATES PATENT OFFICE 2,482,881

GUARD FOR FISHING HOOKS

Edwin W. Sonner, Jr., Queens Village, N. Y.

Application November 18, 1948, Serial No. 60,799

2 Claims. (Cl. 43—31)

This invention relates to new and useful improvements in means and apparatus provided as fishing hook guards, and it has more especially for its object to provide a guard for a triple, or three prong fishing hook, whereby the latter may be safely and easily carried, and thereby preventing any danger to the fisherman using it, while at the same time permitting the convenient storage of such fishing hooks, when not in use.

The device constituting said fishing hook guard is made of any suitable material, for instance by molding a slightly pliable material, preferably hard rubber, which at the same time has retained enough elastic property to permit the insertion and subsequent retention of the hooks therein.

The device may also be made to accommodate a fishing hook with two, or more than three prongs, although it will be especially suitable for a triple hook.

As the device is simple of construction, the cost of manufacturing the same will be very small.

With the above and other objects in view, this invention consists of the novel features of construction, combination and arrangement of parts, hereinafter fully described, claimed and illustrated in the accompanying drawing forming part of this application, and in which similar characters of reference indicate corresponding parts in all views, and in which:

Figure 1 is a side elevational view of a conventional lure provided with two, triple fishing hooks of the well known kind commonly in use, showing my guard applied to the prongs of said hooks.

Figure 2 is a transverse view, taken on the line 2—2 in Figure 1; while

Figure 3 is a transverse sectional view, taken on the line 3—3 in Fig. 1, and

Figure 4 is a bottom view of the device shown in Figure 1.

Referring more particularly to the drawing, the numeral 10 indicates a fishing implement provided with the fishing hooks 11 and 12, said hooks consist of the stems 13 and the prongs 14. Guards mounted on said hooks are indicated by the numeral 15.

The said guards consist, as described before, each of a substantially hard rubber member, having, however, a slight flexibility.

The guards are each formed with a central opening 16 adapted to receive the stem 13 of a fishing hook; said guard is further provided with a slot 17 leading to the opening 16 and formed with a vertical V-shaped entrance 18; the slot 17 is of a width large enough to permit the entrance of the stem 13, which is located in the opening 16, when the guard is in protective position. The guard is further provided with slits 19, 19 extending a distance from the periphery of the guard toward the opening 16; said slits are each formed with a V-shaped entrance only at the bottom thereof, as shown at 20, whereby to facilitate and permit an easy adjustment and seating of the prongs 14 within said slits and the slot 17.

At the same time the walls of the entrances 28 to the slits 19, 19 as well as to the slot 17, are, in addition, formed with slightly curved portions 21 at the bottom in order further to facilitate the seating of the hooks.

It is obvious that changes may be made in the form, construction and arrangement of the several parts, as shown, within the scope of the appended claims, without departing from the spirit of the invention, and I do not, therefore, wish to limit myself to the exact construction shown and described herein.

What I claim as new, and desire to secure by Letters Patent of the United States, is:

1. In a device of the class described, a member of a slightly elastic material, said member being formed with a vertical opening in the center thereof adapted to loosely receive the shank of a triple fishing hook, the sides of said member being formed with a vertical slot and two vertical slits therein arranged at a substantially equal distance from each other and adapted to receive the hooks proper of the fishing hook, said member being formed with a vertical V-shaped entrance to said slot communicating with the central opening, and the lower surface of the member having V-shaped entrances connecting with said slot and slits, substantially as and for the purpose set forth.

2. In a device of the class described, a member having a vertical opening in the center thereof adapted to loosely receive the shank of a triple fishing hook, the sides of said member being formed with one vertical slot leading to the center opening, and two vertical slits extending a short distance from the periphery of the member towards said center opening, the slot and slits being arranged at a substantially equal distance from each other, said member being formed with a vertical V-shaped entrance to the slot, and the lower surface of said member having V-shaped entrances extending a short distance into said slot and slits, whereby to facilitate the placing of the prongs of the fishing hook in the latter, substantially as and for the purpose set forth.

EDWIN W. SONNER, JR.

REFERENCES CITED

The following references are of record in the file of this patent:

UNITED STATES PATENTS

| Number | Name | Date |
| --- | --- | --- |
| 1,255,516 | Daller | Feb. 5, 1918 |
| 2,095,048 | Aikins | Oct. 5, 1937 |
| 2,185,507 | Knapp | Jan. 2, 1940 |
| 2,204,185 | Lougheed | June 11, 1940 |